(12) United States Patent
Smith et al.

(10) Patent No.: US 7,168,443 B2
(45) Date of Patent: Jan. 30, 2007

(54) TANKS

(75) Inventors: Warwick Bruce Smith, Palmerston North (NZ); Christopher Torr, Feilding (NZ)

(73) Assignee: C-Dax Systems Limited, Palmerston North (NZ)

( * ) Notice: Subject to any disclaimer, the term of this patent is extended or adjusted under 35 U.S.C. 154(b) by 224 days.

(21) Appl. No.: 10/166,380

(22) Filed: Jun. 11, 2002

(65) Prior Publication Data

US 2002/0185180 A1 Dec. 12, 2002

(30) Foreign Application Priority Data

Jun. 11, 2001 (NZ) .................................. 512301

(51) Int. Cl.
*B60P 3/30* (2006.01)
*B65D 21/02* (2006.01)
*A01M 7/00* (2006.01)

(52) U.S. Cl. ........................... 137/355.12; 137/355.17; 137/550; 137/565.17; 137/590; 220/23.4; 220/562; 239/172; 239/195; 239/304

(58) Field of Classification Search ........... 137/355.12, 137/355.16, 565.17, 565.34, 587, 550, 590; 220/23.4, 23.83, 562; 239/146, 172, 175, 239/195, 198, 303, 304, 305; 280/833
See application file for complete search history.

(56) References Cited

U.S. PATENT DOCUMENTS

| 640,118 | A | * | 12/1899 | Eck | ............................ 239/172 |
|---|---|---|---|---|---|
| 2,569,494 | A | * | 10/1951 | Prior | ........................... 280/833 |
| 2,889,954 | A | * | 6/1959 | Tozier | ........................ 220/23.4 |
| 3,225,951 | A | * | 12/1965 | Poston et al. | ............... 220/23.4 |
| 3,658,204 | A | * | 4/1972 | Bottger | ....................... 220/23.4 |
| 4,378,026 | A | * | 3/1983 | Bauer | ..................... 137/355.16 |
| 4,449,723 | A | * | 5/1984 | Shiratsuchi | ................. 280/833 |
| 4,629,087 | A | * | 12/1986 | Lenz | ....................... 220/23.83 |
| 4,741,362 | A | * | 5/1988 | Smola | ......................... 137/587 |
| 5,236,000 | A | * | 8/1993 | Kizer | .......................... 137/590 |
| 5,419,493 | A | * | 5/1995 | Redway | ...................... 239/172 |
| 5,476,146 | A | * | 12/1995 | Brown | ........................... 169/24 |
| 5,988,213 | A | * | 11/1999 | Yoshioka | ..................... 137/590 |
| 6,026,974 | A | * | 2/2000 | Burt | .......................... 220/23.4 |
| 6,340,177 | B1 | * | 1/2002 | Granderson et al. | ......... 280/833 |
| 2001/0030191 | A1 | * | 10/2001 | Bopp et al. | ................. 220/23.4 |

* cited by examiner

*Primary Examiner*—John Rivell

(57) ABSTRACT

A tank which is primarily intended for spraying applications and mountable on an all terrain vehicle ("ATV"). The tank (10) includes a main tank section (11) which, in use, extends laterally of the ATV and at least one longitudinally extending arm 12. The pump assembly is located in a cavity (14) in the underside of the main tank section (11). A cover (15) can cover the cavity (14) to mount the pump assembly in place. The tank (10) can include a removable auxiliary tank (21).

27 Claims, 6 Drawing Sheets

TANKS

BACKGROUND OF THE INVENTION

This invention relates to a tank.

The mounting of so-called "straddle tanks" on a farm vehicle such as an All Terrain Vehicle ("ATV") is well known. Generally these straddle tanks have a main tank portion which sits laterally across the ATV (being mounted to the front or rear carrier of the ATV) and has at least one but more usually a pair of arms which extend along one or along each side of the ATV. The tank will generally carry an electric pump.

For stability reasons it is desirable that the tank not adversely affect the balance of the ATV. However, some of the tanks of this type have effectively impacted on the centre of gravity of the ATV when loaded with the tank and consequently instability problems have arisen.

Tanks of this type do not generally include provision for carrying a supply of chemicals or clean water. Thus a user may have to return to a point where chemicals are stored so as to refill the tank when chemical spraying is taking place.

SUMMARY OF THE INVENTION

It is one object of the present invention to provide a tank which is particularly useful for mounting on an All Terrain Vehicle and which provides a means for readily carrying a supply of chemicals or clean water.

Broadly according to one aspect of the present invention there is provided a tank including a main tank section which in use extends laterally of a vehicle and at least one arm section which extends longitudinally of the vehicle, the tank being characterized in having an auxiliary tank removably mounted thereto.

Preferably the tank has in the underside thereof a cavity to accommodate a pump assembly, the pump assembly being held in place in the cavity by a removable cover.

BRIEF DESCRIPTION OF THE DRAWINGS

In the following more detailed description of the invention according to one preferred embodiment reference will be made to the accompanying drawings in which.

DESCRIPTION OF PREFERRED EMBODIMENTS OF THE INVENTION

Figure 1:
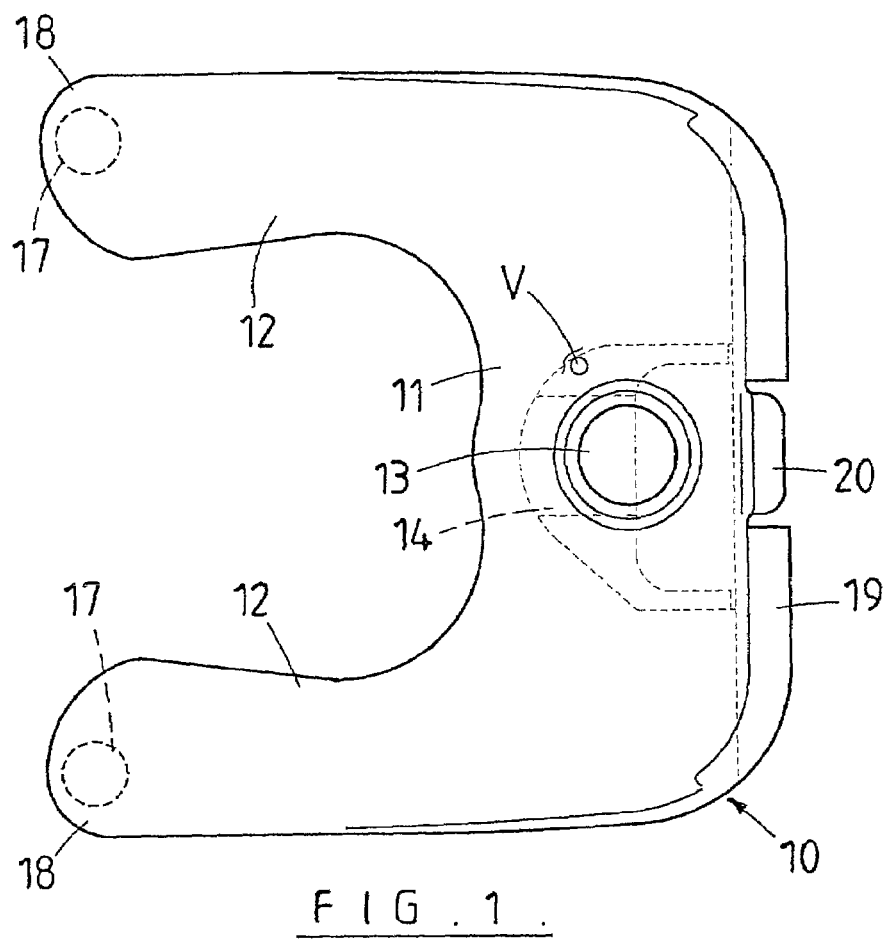
FIG. 1 is a plan view of the tank.
Figure 2:
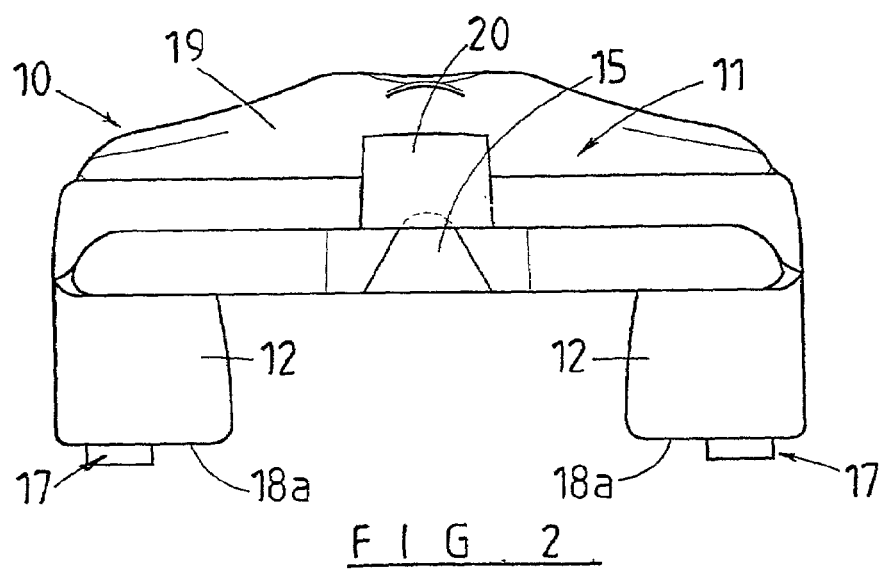
FIG. 2 is a back elevation view of the tank.
Figure 3:
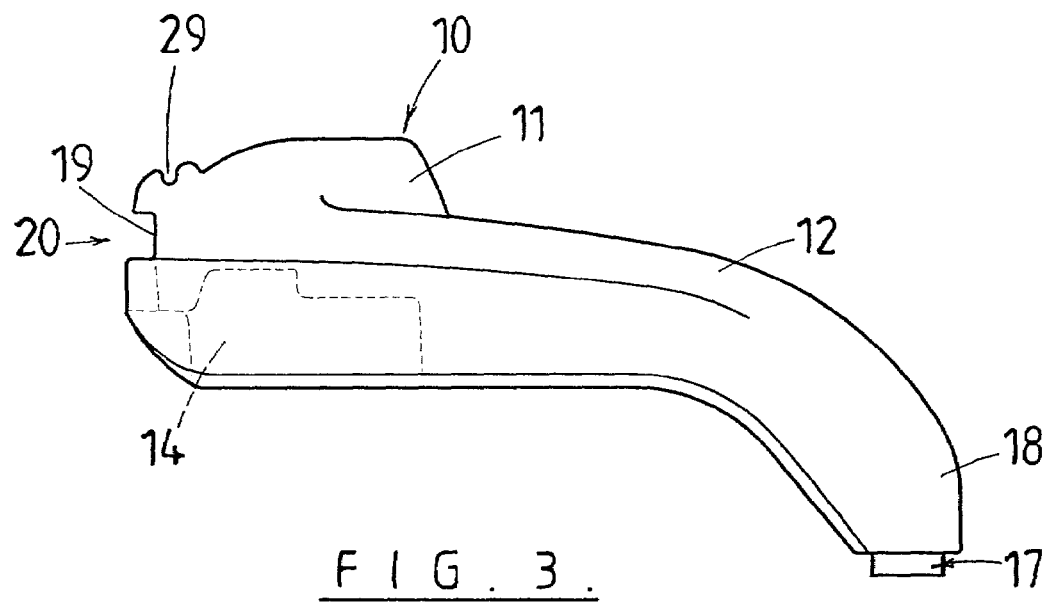
FIG. 3 is a side elevation view of the tank.
Figure 10:
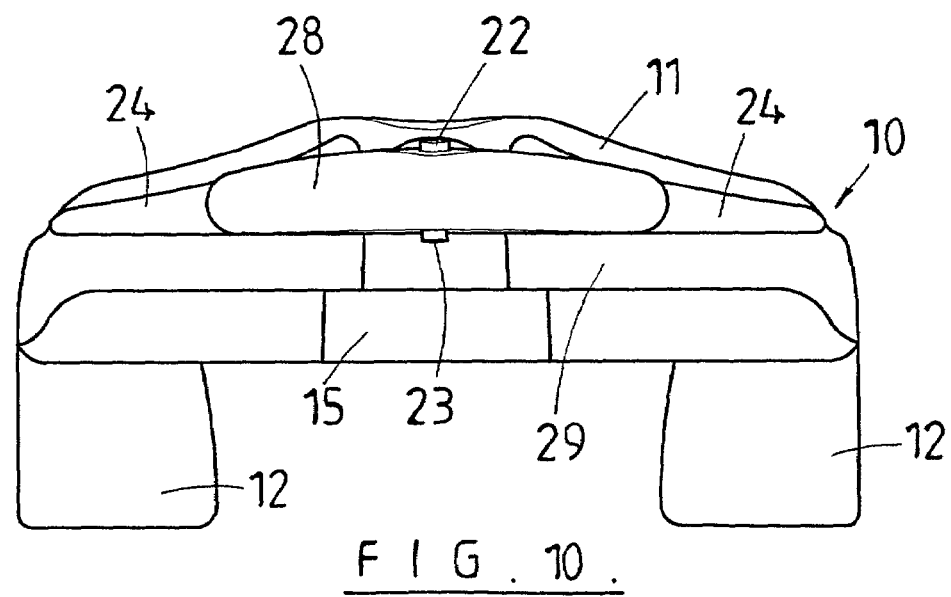
FIG. 10 is a rear elevation view of the arrangement shown in FIGS. 8 and 9.
Figure 4:
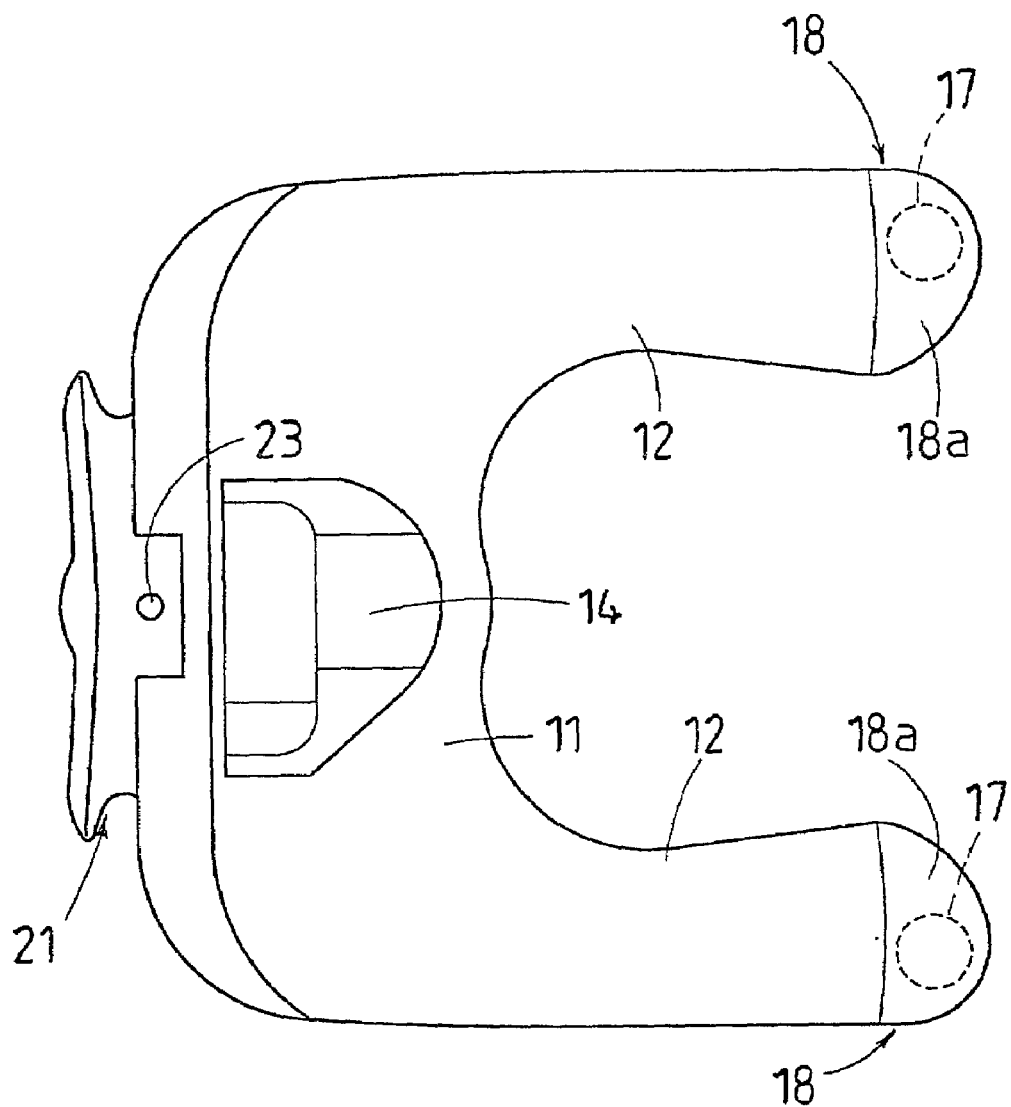
FIG. 4 is a bottom plan view of the tank (with an auxiliary tank fitted)
Figure 7:
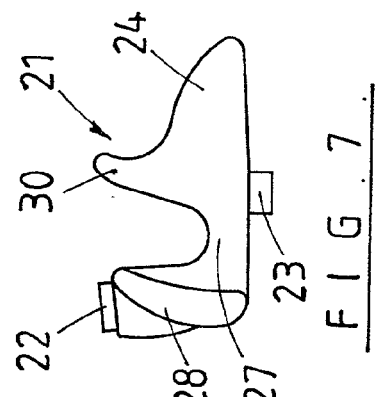
FIG. 7 is an end elevation view of the auxiliary tank.
Figure 5:
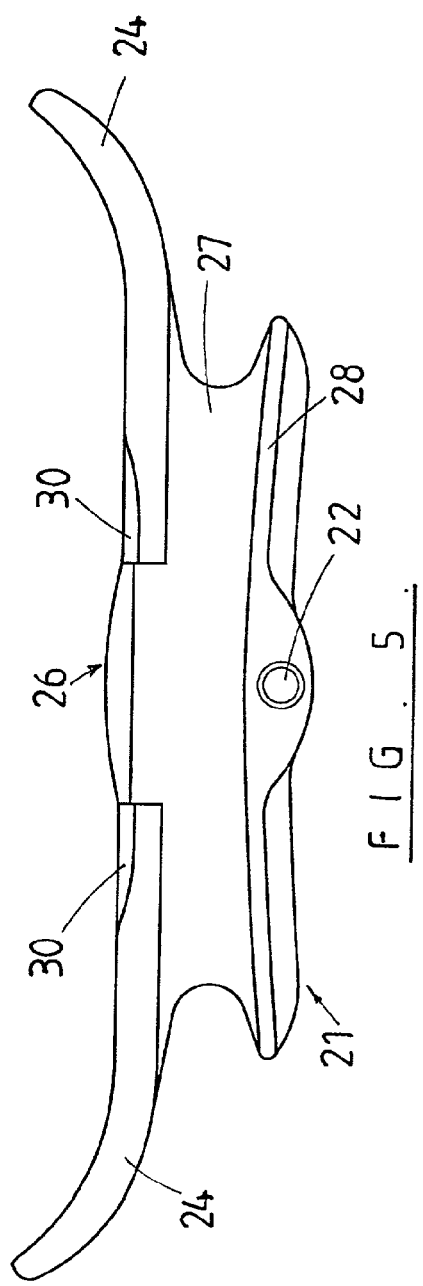
FIG. 5 is a plan view of an auxiliary tank to be fitted to the main tank.
Figure 6:
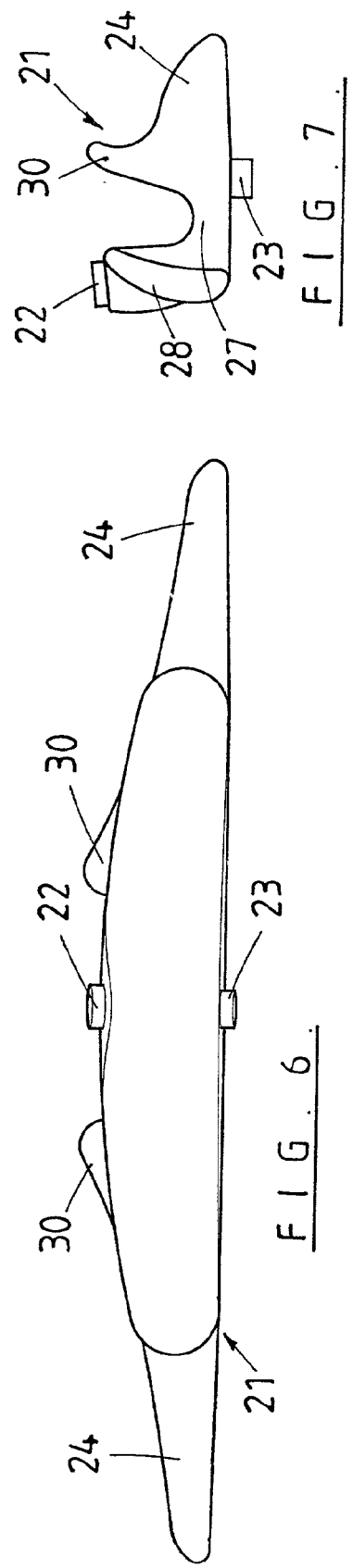
FIG. 6 is an elevation view of the auxiliary tank.
Figure 8:
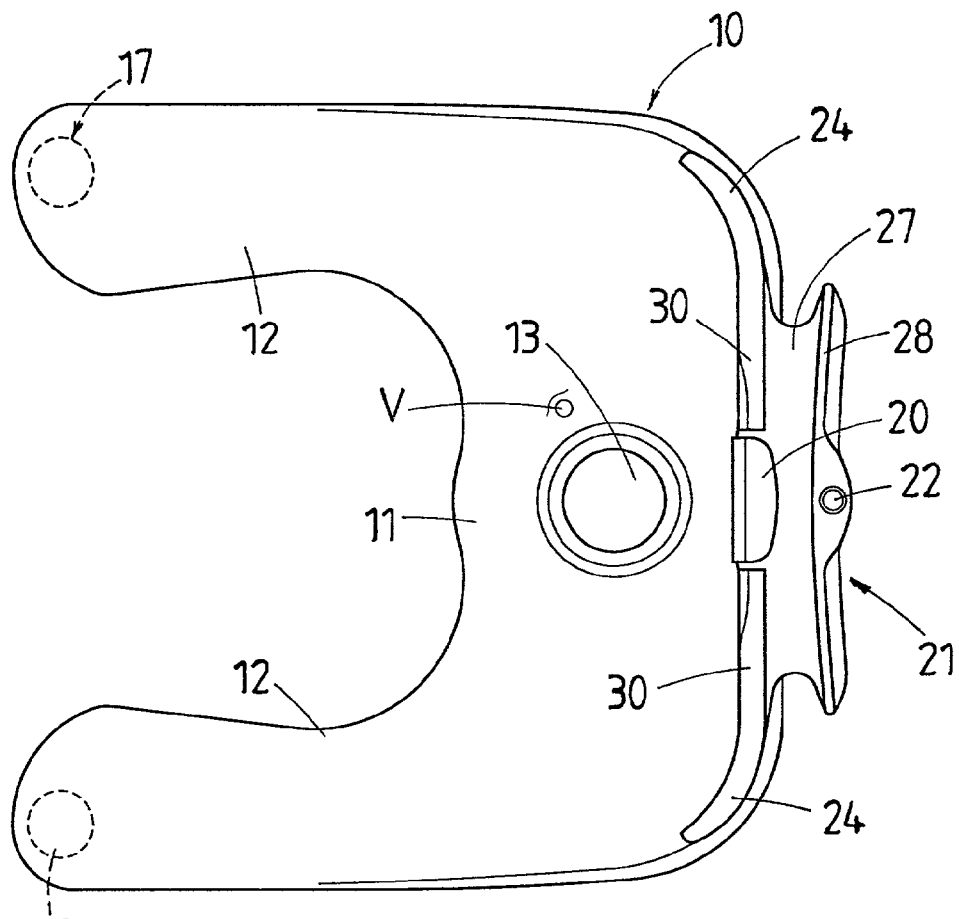
FIG. 8 is a plan view of the tank and auxiliary tank mounted together.
Figure 9:
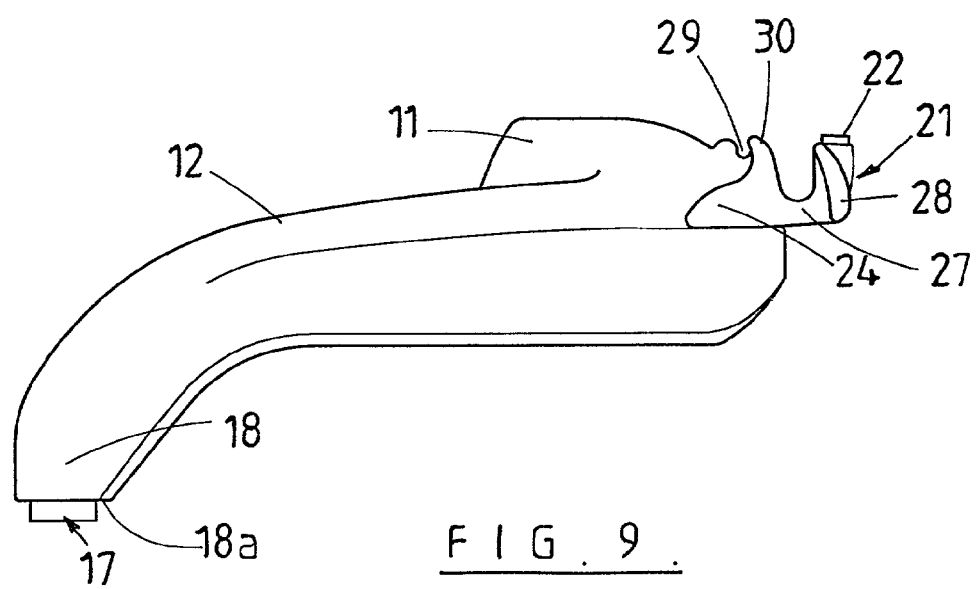
FIG. 9 is a side elevation view of the arrangement shown in FIG. 8.
Figure 11:
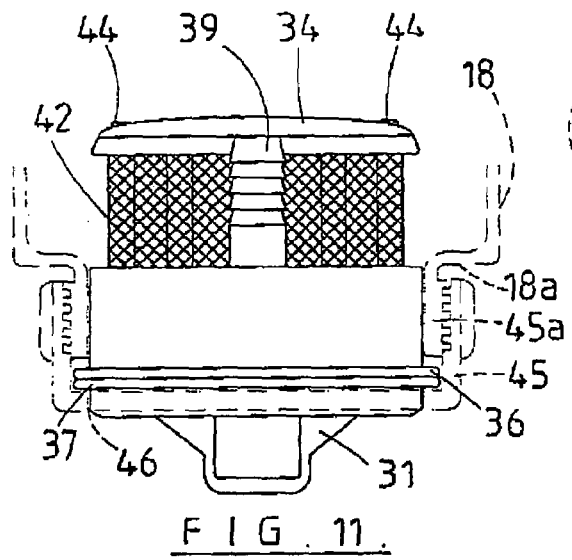
FIG. 11 is an elevation view of a valve arrangement.
Figure 12:
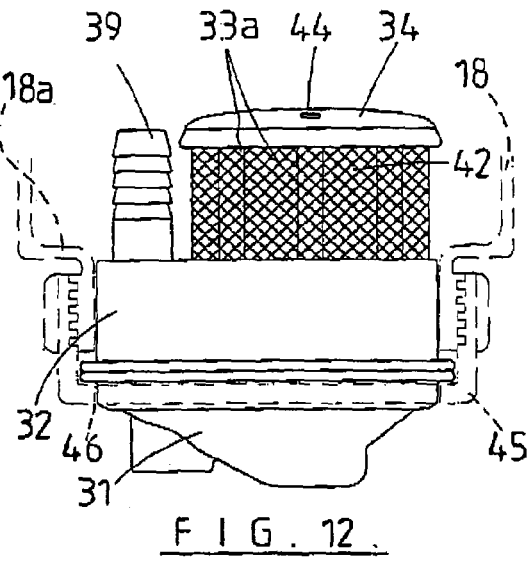
FIG. 12 is a further elevation view of the valve.

In line with known constructions the tank 10 can be formed by a rotational plastic moulding process. The tank is, therefore, formed in one piece.

The tank is of a "straddle" type and thus consists of a lateral section 11 from which extends a pair of parallel spaced apart arms 12. An opening 13 is formed in the upper side of the lateral section 11 for the purposes of loading the tank. A screw on or bayonet fit lid (not shown) is used to close the opening 13.

A cavity 14 is formed in the underside of the lateral section 11. The pump assembly (not shown), being a pump and associated electric motor, is located within this cavity 14. The pump assembly is not held in place by fixings but simply by the attachment of a cover 15 which effectively clamps the pump assembly in place within the cavity 14. This makes for ease of installation as well as ease of access to the pump assembly should servicing, repairs etc. be required.

An advantage of having the cavity 14 located in the underside of the main or lateral portion 11 of the tank 10 is that the cavity is effectively located within the liquid when the tank is full. This leads to a cooling effect on the pump assembly.

Furthermore, by having the pump assembly located within the bottom cavity 14 the effective centre of gravity of the tank lowers as the tank empties. This is contrary to previous designs where the pump assembly has been located on the upside of the tank which means that the centre of gravity still remains high even though the tank becomes lighter due to liquid emptying from the tank.

A further advantage of the mounting of the pump within the bottom cavity 14 is that it is hidden away from view and damage. It also results in a tank having an uncluttered aesthetically pleasing appearance.

According to the present invention all plumbing is internal. The pump is, therefore, plumbed with a pipe through to a pair of valves 17 each of which is removably fitted into the distal end 18 of a respective arm 12 of the tank 10. The pump assembly is plumbed internally in the tank to each valve 17.

Figure 13:
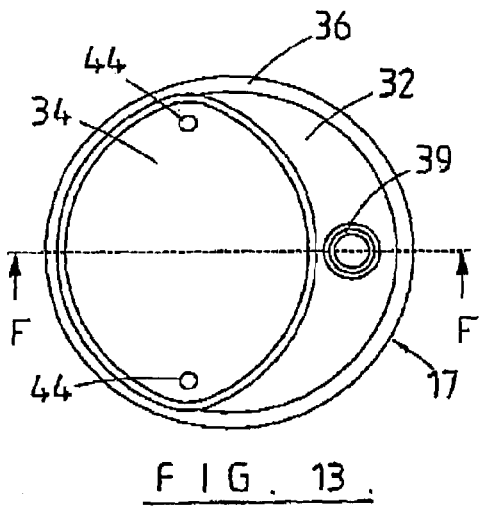
FIG. 13 is a plan view of the valve.
Figure 14:
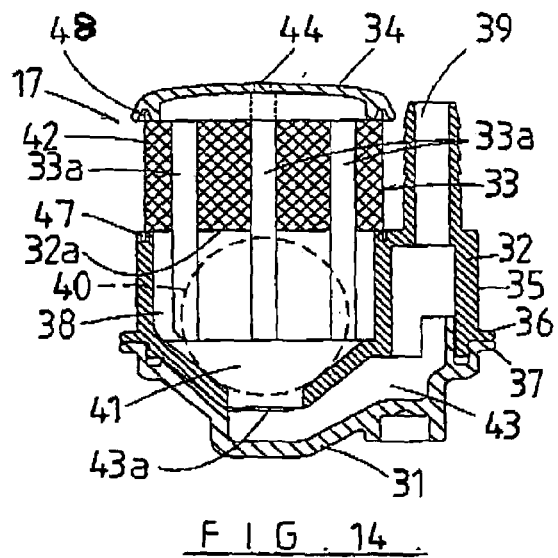
FIG. 14 is a section on line F—F of FIG. 13.

The valve 17 includes a base 31, a body section 32 mounted thereon (see FIG. 13) and a cage section 33. The cage section 33 can be a separate unit mounted onto the body section 32 so that an upper part projects therefrom. However, in the preferred form a series of pillars 33a are moulded with the body section 32 to project from the upper rim 32a of the body section 32. A cover or lid section 34 is mounted onto the ends of the pillars 33a of cage section 33.

The body section 32 incorporates a circular wall 35 with a peripheral flange 36 which mates face to face with flange 37 of the base 31. The valve 17 can thus be sealingly fitted into a circular opening (not shown) in end 18 of arm 12. This can be achieved by an annular wall 45a surrounding the circular opening. The external surface of the annular wall 45a can be formed with or carry a screw thread. An attachment ring 45 with an internal screw thread (which conforms with that on the annular wall) can be engaged over the base 31 so that an internal rim engages with flange 37. By screwing the attachment ring 45 onto the annular wall 45a the flange 36 can be pushed into sealing contact with the surface of the end 18a of arm 12 which defines the circular opening therein.

The method of fixing used to mount valve 17 in arm end 18 can take on other forms. However, it will be of a form such that the valve 17 can be readily removed or at least partially removed.

The body section 32 has an elliptical (in cross-section) cavity 38. The pillars 33a are moulded into the wall of the cavity 38.

A nipple 39 projects from body section 32. A tube (not shown) is fitted onto nipple 39 to extend along arm 18 and through lateral section 11 to fit with the pump in the cavity 14. Preferably the tube from the nipple 39 of each valve 17 joins at a junction within lateral section 11 so that only a single tube is connected to the pump. The junction could equally, but less preferably, be located in cavity 14.

In the preferred form of the invention the valve 17 is a ball valve arrangement. The valve thus has a ball 40 located within elliptical cavity 38. In the base of the elliptical cavity is a conical ball valve seat 41.

Located about the pillars 33a of the cage section 33 is a mesh filter 42. The cage section 33 thus defines a more or less cylindrical housing extending above the valve seat 41 and within which the ball 40 can float. Because this cylindrical ball retention area is located within what amounts to an elliptical cavity it means that suction cannot be applied to the ball 40 such as to draw it onto the seat 41 until the tank 10 is more or less empty.

According to one form of the invention the ball 40 can simply be a ball of the type used in the game of squash.

In the proposed arrangement the conical valve seat 41 extends, when the valve 17 is located in arm 18, downwardly from what effectively is the floor of the extreme end 18a of the arm 12. Because suction of the pump is via a tube to nipple 39 which opens to a transfer passage 43 to port 43a in the bottom of the conical seat essentially complete removal of liquid in the tank 10 will be achievable. In essence all that will usually remain in the tank is a small amount of liquid in the conical seat 41 and base 31 (e.g. flow passage 43).

Because favourable suction remains between the ball valve 17 and the pump a pressure relief valve V is provided near the top of the tank (adjacent opening 13) which, when released, vents the tubes in each arm 12 to atmosphere. In a preferred form the vent valve V is connected (preferably directly) to the previously described junction. Consequently the junction of the tubes from valves 17 will be within tank section 11 and a single tube will run therefrom to the pump assembly in the cavity 14.

By having a filtered valve 17 in each arm 12 the tank has an overall filter area nearly three times the filter surface area typical of tanks of this type. Thus good filtering characteristics are achievable. This means that the tank 10 can be filled and exhausted many times before the filters 42 need to be cleaned.

The tube from the pump assembly in cavity 14 to the valve 17 will be arranged to be sufficiently long so that the screw threaded attachment ring 45 holding the valve 17 into the end 18 of arm 12 can be released to let the valve 17 drop down sufficiently from the arm 12 to expose the filter 42 for cleaning.

The lower end of filter 42 engages in a groove 47 which is in the rim 32a of body section 32 and extends there around. Similarly, a groove 48 is provided in the removable cover 34 to engage with the upper end of filter 42. Thus, cover 34 can be removed and the filter 42 slipped off the case section 33 for cleaning. Two of the pillars 33a of the cage section have spigots 44 which press or interference fit in openings in the cover 34. Thus, the cover 34 can be readily removed and refitted.

The rear outward wall 19 of the main tank portion 11 includes a mounting arrangement 20 for an auxiliary tank 21. This auxiliary tank 21 has a removable lid 22 which closes an opening in an upper surface of the tank. Also provided is a drain valve or the like 23 in a lower surface of the tank.

The auxiliary tank 21 has a pair of outwardly extending wings 24 which are preferably contoured to follow the contours of the outside wall 19 of the main tank 11. A mounting portion 26 of the auxiliary tank 21 interengages with the mounting arrangement 20 of the tank so that the auxiliary tank 21 can sit on and be suspended from the rear of the tank 10.

Generally a straddle tank of this type will be fixed to the vehicle by ratchet straps or the like. With the present invention the ratchet straps used to strap about the main section 11 of the tank 10 where it joins with the arms 12 and will also fit over the wings 24 of the auxiliary tank 21. The straps will thus not only hold the tank 10 onto the carrier of the ATV but also strap the auxiliary tank 21 into place.

The auxiliary tank 21 is also configured so as to provide an outboard flange 28. The body portion 27 of the tank 21 between this outboard flange 28 and the wings 24 is of generally curved cross sectional shape. Accordingly a spray hose extending from the pump assembly can be wound about the central body portion 27 of the tank 21 to provide for hose storage.

Furthermore, a spray wand can be stored in a non-use position across the back of the tank 10 by engaging it in the groove 29 of the mounting arrangement 20. In such position the spray wand will also sit behind raised flanges 30 which form extensions of the wings 24 up to the mounting area 20.

The auxiliary tank 21 is readily removable if not required. However, when in place it not only provides a storage means for the spray hose and spray wand but also storage for chemicals or clean water.

Thus, for example, in use chemicals could be held in the auxiliary tank 21 while the main tank 10 is filled with water from a convenient location in the area in which spraying is to occur. In a farm application water could be filled from e.g. a feeding trough etc. Chemical taken from auxiliary tank 21 could then be mixed with the water and spraying take place. This arrangement permits various refilling of the tank 10 to occur without the user having to return to a point where chemicals are stored.

Alternatively if the storage of chemicals is not required the auxiliary tank 21 can contain clean water for the purposes of washing etc.

It is to be understood that the foregoing detailed description is given merely by way of illustration and that numerous modifications and changes may be made without departing from the spirit of the invention.

What is claimed is:

1. A tank including a main tank section which in use extends laterally of a vehicle and at least one arm section which extends longitudinally of the vehicle, the tank being characterised in having an auxiliary tank removably mounted to the main tank section, and the auxiliary tank includes a hose stowage mounting.

2. A tank as claimed in claim 1 wherein the auxiliary tank further includes a spray handpiece mounting.

3. A tank as claimed in claim 2 wherein the auxiliary tank includes at least one wing member whereby the auxiliary tank can be strapped onto the tank.

4. A tank as claimed in claim 1 wherein a cavity is located in the main tank section to accommodate a pump assembly.

5. A tank as claimed in claim 4 wherein the cavity is in the underside of the main tank section and said pump assembly is held in place in the cavity by a removable cover.

6. A tank as claimed in claim 4 wherein the pump assembly is connected to the, or each valve by a conduit which extends from the pump assembly through part of the main tank section and the arm with which the valve is incorporated.

7. A tank as claimed in claim 1 wherein the, or each arm section has a distal end which is located at a level lower than the main tank section, said distal end incorporating a valve.

8. An ATV mountable tank assembly, the assembly comprising:
- a main spray tank configured for carrying a first liquid for spraying, said main tank having a tank wall incorporating a recess in an underside portion of the main tank configured and arranged to, in use, accommodate a pump assembly substantially within the recess but externally of the main tank so that a pump assembly could be mounted externally of the tank in the recess formed in the underside portion of the tank wall;
- an auxiliary tank in which a second liquid can be held separate from the first liquid held within the main tank; and
- a mounting arrangement whereby the auxiliary tank can be engaged with the main tank.

9. An ATV tank assembly as claimed in claim 8 wherein the main tank includes at least one arm section which extends from a main section of said main tank in a direction which, in use, is longitudinal of an ATV vehicle.

10. A tank assembly as claimed in claim 9 wherein a main section of the main tank extends laterally of the said ATV vehicle, and wherein each said arm section has a distal end which is located at a level lower than the main tank section.

11. A tank assembly as claimed in claim 10 wherein each said distal end incorporates a valve.

12. A tank assembly as claimed in claim 11 further comprising a pump assembly connected to each valve by a conduit which extends from the pump assembly, through the tank wall, and then internally of the main tank through at least a part of the main tank section and down the arm with which the valve is incorporated, to the valve.

13. A tank as claimed in claim 11 wherein the valve is removable externally of the arm sufficient to gain access to a filter associated with the valve.

14. A tank as claimed in claim 13 wherein the filter is mounted on the valve.

15. A tank as claimed in claim 14 wherein the filter is a mesh element fitted to a cage portion of the valve within which a ball is movably located.

16. A tank as claimed in claim 15 wherein a nipple is coupled to a conical valve seat by a flow passage.

17. A tank as claimed in claim 13 wherein the valve is a ball valve, a ball element thereof being movably located within the valve in an elliptically shaped cavity, said cavity communicating with a downwardly depending conical valve seat.

18. A tank as claimed in claim 17 wherein an upper part of the elliptical cavity has an apertured cage about which extends said filter.

19. An ATV tank assembly as claimed in claim 8 wherein the auxiliary tank is removably mounted to the main tank.

20. An ATV tank assembly as claimed in claim 19 wherein the auxiliary tank is suspended from the main tank.

21. An ATV tank assembly as claimed in claim 20 wherein the mounting arrangement suspends the auxiliary tank from a section of the main tank which is disposed to extend laterally of an ATV vehicle.

22. An ATV tank assembly as claimed in claim 21 wherein a surface of the auxiliary tank is contoured to follow the contours of the surface of the section of the tank from which the auxiliary tank is suspended.

23. An ATV tank assembly as claimed in claim 19 wherein the auxiliary tank includes at least one wing member, and a strap means engages about the main tank and said at least one wing member to strap the auxiliary tank onto the main tank.

24. An ATV tank assembly as claimed in claim 23 wherein the auxiliary tank includes a pair of oppositely disposed wing members about which straps means are engaged to strap the auxiliary tank onto the main tank.

25. An ATV tank assembly as claimed in claim 8 further including an opening with a removable closure in an upper part of the auxiliary tank and a drain valve in a lower part of the auxiliary tank.

26. A tank assembly as claimed in claim 8 wherein said pump assembly can be held in place in the recess by a removable cover.

27. A tank assembly as claimed in claim 8 further comprising:
- a pump assembly mounted externally of the tank in the recess formed in the underside portion of the tank wall; and
- elements connected to said main tank to spray the first liquid.

* * * * *